United States Patent
Beckmann et al.

(10) Patent No.: US 8,301,157 B2
(45) Date of Patent: Oct. 30, 2012

(54) METHOD, SYSTEM AND DEVICE FOR REDUCING DATA IN A MOBILE COMMUNICATIONS NETWORK

(75) Inventors: Steffen Beckmann, Buxtehude (DE); Jörg Brenner, Hamburg (DE); Carl Mathias Cramer, Henstedt-Ulzburg (DE); Aleksej Dorn, Buchholz i.d.N (DE); Florian Wolff, Hamburg (DE)

(73) Assignee: Siemens Programm- und Systementwicklung GmbH & Co. KG, Hamburg (DE)

( * ) Notice: Subject to any disclaimer, the term of this patent is extended or adjusted under 35 U.S.C. 154(b) by 599 days.

(21) Appl. No.: 12/520,235

(22) PCT Filed: Oct. 29, 2007

(86) PCT No.: PCT/EP2007/061577
§ 371 (c)(1),
(2), (4) Date: Jun. 19, 2009

(87) PCT Pub. No.: WO2008/074558
PCT Pub. Date: Jun. 26, 2008

(65) Prior Publication Data
US 2010/0048203 A1    Feb. 25, 2010

(30) Foreign Application Priority Data
Dec. 19, 2006 (DE) .......................... 10 2006 060 002

(51) Int. Cl.
*H04W 4/00* (2009.01)
*H04W 72/00* (2009.01)
(52) U.S. Cl. ......... 455/453; 455/560; 455/561; 455/431
(58) Field of Classification Search ................. 455/3.01, 455/403, 405, 406, 422.1, 423, 436, 439, 455/442–446, 448–452.2, 69, 509, 560, 561, 455/524–525; 307/154–155; 370/229–241, 370/464–465
See application file for complete search history.

(56) References Cited

U.S. PATENT DOCUMENTS
2002/0057653 A1    5/2002    Dolan et al.
(Continued)

FOREIGN PATENT DOCUMENTS
EP    0797319 A2    9/1997
(Continued)

OTHER PUBLICATIONS

Widrow, B., Stearns, S.D.; "Systems Identification—Adaptive Signal Processing"; Chapter 9; 1985; Cover Pages and pp. 195-225; Prentice-Hall, Englewood Cliffs, New Jersey.

(Continued)

*Primary Examiner* — Ajit Patel
*Assistant Examiner* — Erica Navar

(57) ABSTRACT

A method, system and device for reducing volume of data transmitted between a base station and a control unit in a mobile communications network in which there is inserted into a communication channel between the base station and the control unit a device are provided. Voice data transmitted in each communication channel and associated with a plurality of connections is analyzed. Each connection also includes signaling data a signaling channel, and the connections originating from a base station and terminated in the same or a different base station connected to the device are identified and interconnected, and following the interconnection of the voice channels the transmission of the associated voice data to the control unit is prevented. Thereby, the data volumes transmitted on the voice channels are no longer forwarded to the rest of the mobile communications system and consequently the data volumes transmitted are reduced.

17 Claims, 2 Drawing Sheets

U.S. PATENT DOCUMENTS

| | | | |
|---|---|---|---|
| 2005/0035905 A1* | 2/2005 | Gronemeyer | 342/378 |
| 2006/0154660 A1* | 7/2006 | Waugh et al. | 455/428 |
| 2007/0142044 A1* | 6/2007 | Fitzgerald et al. | 455/422.1 |

FOREIGN PATENT DOCUMENTS

| | | | |
|---|---|---|---|
| WO | WO 20061269223 A1 * | 11/2006 | |
| WO | 2007069229 A1 | 6/2007 | |

OTHER PUBLICATIONS

Widrow, B., Stearns, S.D.; "System Identification—Adaptive Signal Processing"; Chapter 9; 1985; Prentice-Hall, Englewood Cliffs, New Jersey.

* cited by examiner

METHOD, SYSTEM AND DEVICE FOR REDUCING DATA IN A MOBILE COMMUNICATIONS NETWORK

CROSS REFERENCE TO RELATED APPLICATIONS

This application is the US National Stage of International Application No. PCT/EP2007/061577, filed Oct. 29, 2007 and claims the benefit thereof. The International Application claims the benefits of German application No. 10 2006 060 002.9 DE filed Dec. 19, 2006, both of the applications are incorporated by reference herein in their entirety.

TECHNICAL FIELD

The invention relates to a method for reducing the volume of data to be transmitted between a base station and a control unit in a mobile communications network, as well as to a system for performing the method and a device for use in said method.

BACKGROUND ART

Modern cellular digital mobile communications networks have revolutionized mobile communication since the beginning of the 1990s. They have almost completely replaced the existing analog mobile communications networks. Modem standards (in particular GSM, UMTS, CDMA) facilitated a drop in infrastructure and terminal device prices, which led to competition among the telephony providers and to lower charges.

Competition among the companies manufacturing the infrastructure was also promoted as a result of the fact that communication between the network elements was standardized and the interface descriptions and protocols were laid open, consequently enabling mobile communications networks conforming to the aforementioned standards to be built by putting together network elements supplied by any manufacturers. A feature common to all mobile communications networks is that they consist of elements for providing radio coverage (antennas, base stations (in the case of GSM, called "BTS"—Base Transceiver Station), control units (in the case of GSM, called "BSC"—Base Station Controller) and of elements from switching technology (in the case of GSM, called "MSC"—Mobile Switching Center). In addition there exist various other network elements for accomplishing diverse tasks such as providing a connection to the public telephone system (PSTN), user management and the like.

In the development of these standards attention was focused on providing coverage for the urban and rural area, with cell sizes and interfaces being geared to distances and user densities typical therefor.

If there now exists the desire for mobile communication in areas cut off from conventional infrastructure, such as e.g. remote islands, settlements, aircraft and ships, a possible approach is to set up a complete mobile communications system at said locations and to attach them to the public telephone system by way of, for example, telephone cables, directional radio relay links or satellite radio links. This is associated with very high costs, however. In the case of the use of such a system in an aircraft, the considerable weight of said equipment also constitutes a problem.

If, instead, only the absolutely necessary network elements (terminal devices, base station) are brought to these remote locations and the connection to the rest of the mobile communications system is routed via a transmission system, then the question arises as to how to transfer the connection of said exposed network elements to the rest of the mobile communications system. In principle this problem can be solved; corresponding data links can be set up without problems to practically any location worldwide.

Communication between mobile communication subscribers within a remote area of said kind subjects the connection to the control units to load without the transmission of data, generally voice data, as far as the switching technology elements actually being necessary. The data stream accruing in the process reduces the remaining transmission capacity for connections for which the transmissions on said interface are absolutely essential. Only data that is required for signaling purposes needs to be transported in every case as far as the switching technology elements.

According to the prior art said object is achieved by means of an evaluation of the signaling data, wherein either a central network element performs the corresponding control functions in the affected base station or a base station keeps a list of the subscribers registered in each case (HLR function) and itself performs the corresponding control functions. (WO2007/069229) Other solutions are described, for example, in US2006/0154660 or EP0797312.

DISCLOSURE OF THE INVENTION

The object underlying the invention is to reduce the volume of data to be transmitted on the interface between the base station and the control unit of a mobile communications network.

The object is achieved by means of a method, a system and a device as claimed in the independent. Advantageous embodiments are the subject matter of dependent claims.

According to the basic concept of the invention the device inserted into the connection from the base station to the control unit achieves the object in that it
  analyzes the voice data transmitted on the connection from a base station to a control unit by means of system identification,
  interconnects the voice channels of connections originating from a base station and terminated in the same or a different base station connected to the device, and
  prevents the transmission of said voice data to the control unit after said voice channels have been interconnected.

The purpose of the analysis of the voice data is to identify voice channels on which voice data belonging to the same connection is transmitted.

Various mathematical methods are available for identifying associated voice channels. Suitable methods are "correlation analysis" (described in chap. 13.5, Stearns, S. D.; "Digital processing of analog signals"; Oldenbourg, München & Wien 1984) or "system identification" (described in chap. 9, "Adaptive Signal Processing"; Widrow, B.; Steams, S. D.; Prentice-Hall, Englewood Cliffs, N.J., 1985).

If a pair of voice channels is identified as belonging together, this means that the connection was initiated by a mobile terminal device which is registered with a base station which routes its communication channel with its assigned control unit via the inventive device. It is further recognized by means of successful identification that the second mobile terminal device involved in the connection is also registered with a base station which routes its communication channel with its assigned control unit via the same inventive device. The inventive device thereupon connects said identified voice channel pairs together internally and prevents the voice data transmitted on said voice channels from being forwarded to the assigned control unit.

By this means it is possible to achieve the advantage that as soon as the device detects two associated voice channels and has connected them in the device, the data volumes transmitted on said voice channels are no longer forwarded to the rest of the mobile communications system and consequently the volumes of data transmitted via the interface to the control unit are reduced.

The main aspect of the invention is that connections inside a remotely positioned part of a mobile communications network which is equipped with an inventive device henceforth load the interface of a control unit only with the indispensable signaling data. Said interface can therefore be routed via a transmission channel with low bandwidth or, if the bandwidth remains the same, more connections can be transmitted simultaneously over said channel.

An advantageous embodiment of the invention makes provision for implementing the function in a network element inserted into the interfaces between one or more base stations and their assigned control unit. This enables an existing mobile communications network to be improved without the need to change already existing network elements.

In a further favorable embodiment of the invention it is recommended to integrate the function into the base station. This enables a network element to be modified in such a way that it possesses the inventive functionality. This is particularly favorable when only one base station is assigned to a control unit.

In a preferred development of the invention it is recommended to design the device in such a way that by using the signaling information which is routed through it and which is exchanged at each call setup both by the mobile terminal device and by the mobile communications network it establishes the times at which a call is set up and only then starts analyzing the voice channels. In this way the computing power requiring to be made available in the device can be reduced.

BRIEF DESCRIPTION OF THE DRAWINGS

By way of example.

DETAILED DESCRIPTION OF THE INVENTION

Figure 1:
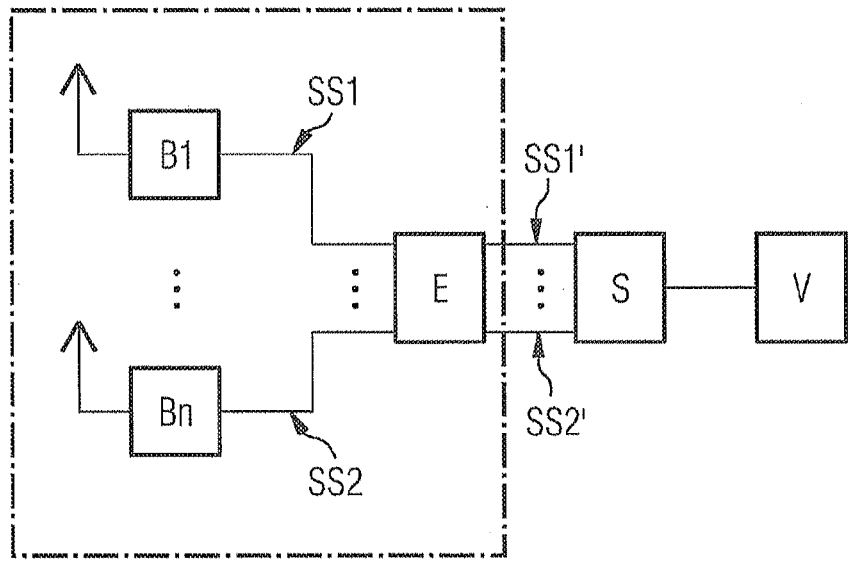
FIG. 1 shows the basic layout of a cellular mobile communications network. The main network elements affected by this invention are shown: base station B and control unit S, and a switching unit V, as well as the inventive device E. Mobile communications networks deployed in real-world scenarios also possess other network elements that are of no relevance to this invention and are connected to the public telephone network (PSTN). The framed part represents the remotely deployed network elements.

FIG. 1 shows the basic layout of a cellular mobile communications network in the case of the particularly pronounced physical separation of the network elements base station B and control unit S, e.g. in an application scenario in an aircraft. The framed part represents the remotely deployed network elements. A control unit S and an associated switching unit V form the core of the mobile communications network. In most cases the switching unit V is connected to the public telephone network (this is not shown in FIG. 1). The control unit S is assigned one or more base stations B1 . . . Bn. Said base stations B1 . . . Bn are connected to the control unit S via the interfaces SS1 . . . SSn. The inventive device E is disposed in the signal path of the interfaces SS1 . . . SSn. The part of the connection of a base station B to its assigned control unit S that lies between the base station B and the inventive device E is called SS1 . . . SSn. The signals and data occurring on said section are unaffected by the device E. The part of the connection of a base station B to its assigned control unit S that lies between the control unit S and the device E is called SS1' . . . SSn'.

During the setting up of a connection, channels for voice transmission between the terminal devices M involved in the connection are switched by the mobile communications network. Using system identification, the device E continuously analyzes all the voice transmission channels routed through it to determine whether voice channels are present which belong to the same connection. This is the case in all instances in which the terminal devices M involved in the connection are registered with the mobile communications network via base stations B which in each case route their communication channels to their assigned control units S via the device.

Figure 2:
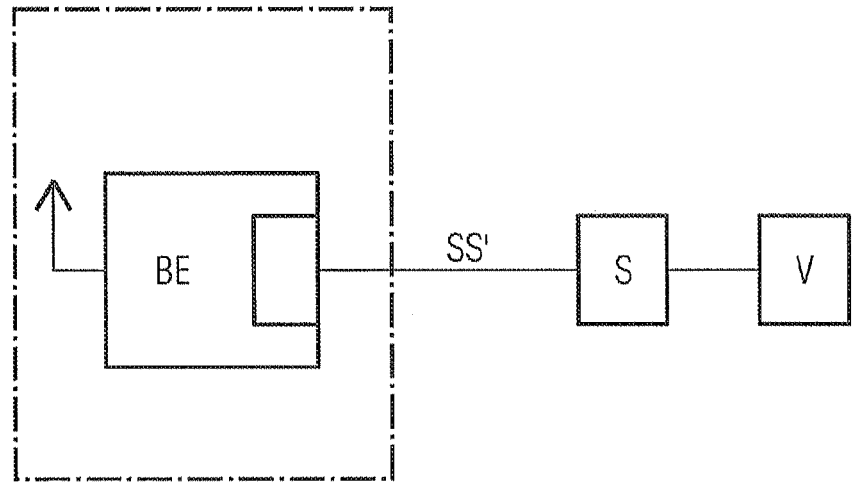
FIG. 2 shows an inventive implementation according to the claims. The functionality on which the invention is based is integrated into the base station.

FIG. 2 schematically shows a mobile communications network in the case of the particularly pronounced physical separation of the network elements base station B and control unit S, which network, in contrast to the mobile communications network shown in FIG. 1, possesses only one base station BE remote from its assigned control unit S. In this case the functionality of the inventive device E is integrated into the base station B.

Figure 3:
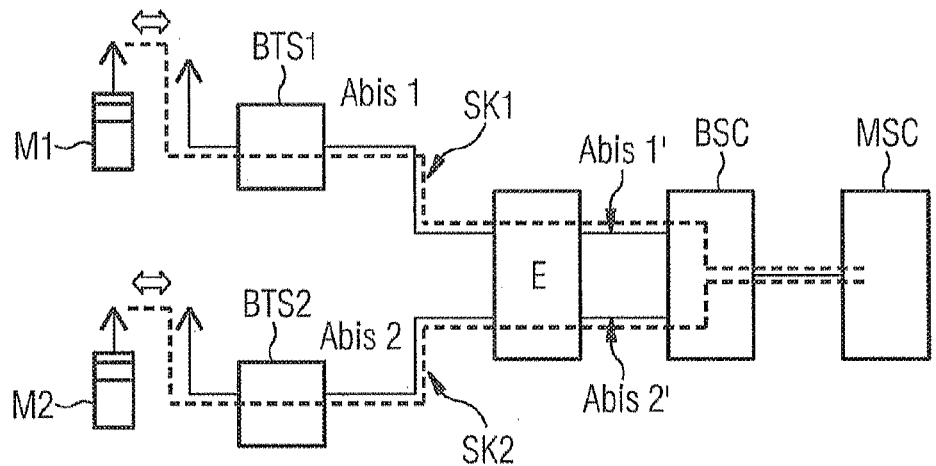
FIG. 3 shows a mobile communications network using the example of the GSM standard with an inventive device E in the state of analyzing the voice channels routed through the device E.

FIG. 3, using the example of a GSM network, schematically shows the layout of a mobile communications network in the case of an inventive arrangement of the device E on which the invention is based. The base station B (which, if the mobile communications network is a GSM network, is called a base transceiver station BTS) is connected to the control unit S (which, if the mobile communications network is a GSM network, is called a base station controller BSC). Disposed in the course of this connection are the inventive device E and the transmission channel via which the remotely deployed network elements are connected to the rest of the mobile communications network. It is essential that the inventive device E is disposed between the base station BTS and said transmission channel.

The mobile terminal device M1 conducts a voice connection to the mobile terminal device M2. The voice channel SK1 leads from the mobile terminal device M1 via the base station BTS1 with which the mobile terminal device M1 is registered, via the inventive device E, via the control unit BSC to the switching unit MSC. The voice channel SK2 leads from the mobile terminal device M2 via the base station BTS2 with which the mobile terminal device M2 is registered, via the inventive device E, via the control unit BSC to the switching unit MSC. In said switching unit MSC the voice channels SK1 and SK2 are connected together and as a result the mobile terminal devices M1 and M2 can exchange voice data.

Figure 4:
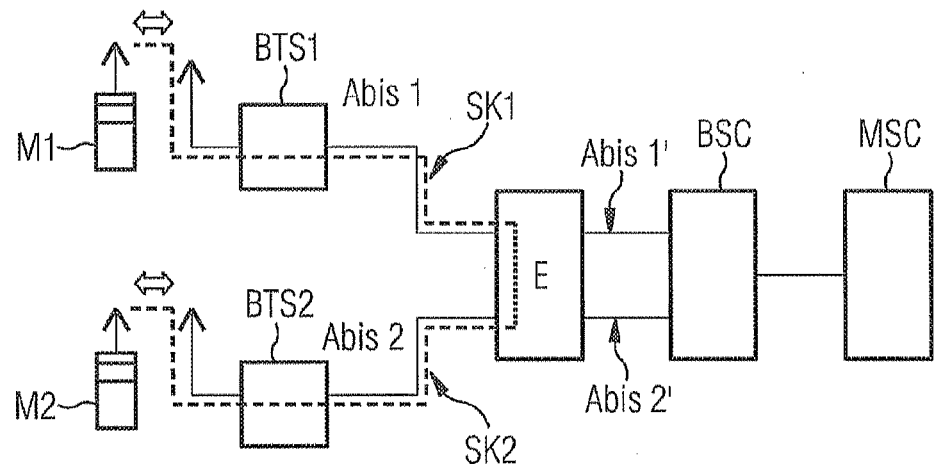
FIG. 4 shows a mobile communications network using the example of the GSM standard with an inventive device E in the state following the analysis of the voice channels routed through the device E, completed interconnection of the channels, and prevented forwarding of the voice data to the control unit.

FIG. 4 shows the same mobile communications network as in FIG. 3, likewise in the case of an existing voice connection between the mobile terminal devices M1 and M2. In this case the figure depicts the state which exists following successful identification of the voice channels SK1 and SK2 shown in FIG. 3 as originating from a connection and completed interconnection and prevention of the forwarding of the voice data to the control unit BSC. The interfaces Abis1', Abis2' and A are relieved of the load of transmitting the voice data arising from the connection of the mobile terminal device M1 to the mobile terminal device M2.

The invention claimed is:

1. A method for a device in a mobile communications network and which is inserted into a communication channel between a base station and a control unit in order to reduce the volume of data transmitted between the base station and the control unit, the method comprising:
   by the device:
      analyzing a voice data transmitted in a voice channel in each communication channel and associated with a plurality of connections, in addition to the voice data routed in a voice channel each connection also includes signaling data in at least one signaling channel, and
      identifying from the analyzed voice data which connections originate from a first base station and terminate in the first or a second base station that are connected to the device;
      interconnecting the voice channels of the identified connections in the device; and
      preventing the voice data of the interconnected voice channels being transmitted to the control unit after the interconnection of the voice channels.

2. The method as claimed in claim 1, wherein the mobile communications network conforms to the GSM standard.

3. The method as claimed in claim 1, wherein the device is disposed in an aircraft.

4. The method as claimed in claim 1, wherein the device is disposed in a ship.

5. The method as claimed in claim 1, wherein the device is disposed at a physically remote location in the geographical sphere of action of the mobile communications system.

6. The method as claimed in claim 1, wherein the device applies the mathematical method of correlation analysis for analyzing the voice channels routed via the device.

7. A method for a mobile communications system to reduce the volume of data transmitted between a base station and a control unit, comprising:
   providing a device inserted into a communication channel between a base station and a control unit;
   analyzing a voice data transmitted in a voice channel in each communication channel and associated with a plurality of connections, in addition to the voice data routed in a voice channel each connection also includes signaling data in at least one signaling channel, and
   identifying from the analyzed voice data which connections originate from a first base station and terminate in the first or a second base station that are connected to the device;
   interconnecting the voice channels of the identified connections in the device; and
   preventing the voice data of the interconnected voice channels being transmitted to the control unit after the interconnection of the voice channels.

8. The method as claimed in claim 7, wherein the mobile communications network conforms to the GSM standard.

9. The method as claimed in claim 7, wherein the device is disposed in an aircraft or a ship.

10. The method as claimed in claim 7, wherein the device is disposed at a physically remote location in the geographical sphere of action of the mobile communications system.

11. The method as claimed in claim 7, wherein the device applies the mathematical method of correlation analysis for analyzing the voice channels routed via the device.

12. A device for use in a mobile communications system, comprising:
   a first voice channel connecting the device to a first base station, the first voice channel having a first voice transmission;
   a second voice channel connecting the device to a second base station, the second voice channel having a second voice transmission;
   a signaling channel connecting the device to the first base station, the signaling channel having signaling information;
   a connection that transports the signaling information between control unit and the device;
   a system identification that analyzes the first and second voice transmissions and identifies a connection originating from the first base station and terminating in the second base station; and
   an interconnection of the first and second voice channels when the connection is identified to originate from the first base station and terminate in the second base station, such that the voice channels are connected via the device and not transmitted to the control unit, thereby preventing the voice data of the interconnected voice channels from being transmitted to the control unit.

13. The device as claimed in claim 12, further comprising a further signaling channel to the second base station.

14. The device as claimed in claim 12, wherein the first and the second base stations are the same base station.

15. The device as claimed in claim 12, wherein the device is disposed at a physically remote location in the geographical sphere of action of the mobile communications system.

16. The device as claimed in claim 12, wherein the device applies the mathematical method of correlation analysis for analyzing the voice channels routed via the device.

17. The method as claimed in claim 1, wherein the preventing includes stop transmitting voice data on interfaces from the device to the control unit, which are associated with the identified connections.

* * * * *